United States Patent
Horie et al.

(10) Patent No.: US 6,796,920 B2
(45) Date of Patent: *Sep. 28, 2004

(54) SILENT CHAIN POWER TRANSMISSION APPARATUS

(75) Inventors: Hiroshi Horie, Osaka (JP); Kazumasa Matsuno, Osaka (JP); Shigekazu Fukuda, Osaka (JP); Takayuki Funamoto, Osaka (JP); Yoshinori Iwasaki, Osaka (JP); Toyonaga Saito, Osaka (JP); Masatoshi Sonoda, Osaka (JP); Kenshi Suzuki, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 95 days.

This patent is subject to a terminal disclaimer.

(21) Appl. No.: 09/837,974

(22) Filed: Apr. 19, 2001

(65) Prior Publication Data

US 2002/0028720 A1 Mar. 7, 2002

(30) Foreign Application Priority Data

Apr. 19, 2000 (JP) .................................. 2000-118373

(51) Int. Cl.[7] .............................................. F16G 13/02
(52) U.S. Cl. .................................. 474/213; 474/212
(58) Field of Search ............................ 474/212, 213, 474/214, 221, 215

(56) References Cited

U.S. PATENT DOCUMENTS 3,661,025 A    5/1972  Avramidis
4,915,676 A *  4/1990  Komeya ................ 474/213
5,628,702 A *  5/1997  Kotera .................. 474/213
6,077,181 A *  6/2000  Kanehira et al. ........ 474/212
6,244,983 B1 * 6/2001  Matsuda ................ 474/155
6,334,828 B1 * 1/2002  Suzuki .................. 474/212

FOREIGN PATENT DOCUMENTS

EP     0 284 861 A1   10/1988
GB     2 347190 A      8/2000
JP     2000065156 A *  3/2000  ........... F16G/13/04

OTHER PUBLICATIONS

K. Suzuki, "Silent Chain Drive Mechanism", U.S. Patent Application No. 09/750,983, filed Dec. 28, 2000.

* cited by examiner

Primary Examiner—Marcus Charles
(74) Attorney, Agent, or Firm—Howson and Howson

(57) ABSTRACT

In a transmission comprising an endless silent chain and a sprocket the inside tooth faces of the link plates of the chain are identical to tooth profiles, arranged axially, of a hob cutter for forming teeth of the sprocket. The inside and outside tooth faces also satisfy $Hi=Ho+Hs$, where $Hi$ is the distance from a pin center line $Lp$ to a pitch line $Li$ of the inside tooth faces, $Ho$ is a distance from the pin center line to a pitch line $Lo$ of the outside tooth faces, and $Hs$ is the amplitude of polygonal motion of the chain. Each link plate also has a concave bottom surface between its teeth to avoid interference with edges of the involute teeth arising due to the chain polygonal motion amplitude when the outside tooth faces are brought into meshing engagement with the involute teeth and become seated thereon.

2 Claims, 10 Drawing Sheets

SILENT CHAIN POWER TRANSMISSION APPARATUS

BACKGROUND OF THE INVENTION

1. Field of the Invention

The present invention relates to an improvement in a silent chain power transmission apparatus for use as a timing chain for timed power transmission in an automobile, a power transmitting chain in an industrial machine, or the like.

2. Description of the Related Art

In a conventional silent chain power transmission apparatus, an endless silent chain is employed which comprises a multiplicity of link plates interleaved by a multiplicity of connecting pins in a fingers-crossed fashion, as illustrated in FIG. 8 hereof. Each link plate 100 has a pair of V-shaped teeth 10 each defined by inside and outside faces 1, 2 for meshing with teeth of a sprocket S as shown in FIG. 8 hereof. As can be clearly seen from FIG. 7, the inside tooth faces 1 are scooped out deeper inwardly than the profiles, symmetrical with the profiles of the outside tooth faces 2, of imaginary inside tooth faces 1' so that their interference with the teeth of the sprocket upon intermeshing can be prevented. Accordingly, pitch line Li of the inside tooth faces is positioned closer to the pin center line Lp than a pitch line Lo of the outside tooth faces. The pitch line Li is a line passing parallel to pin center line Lp over two inside tooth faces 1 of the link plate at points where a distance between those two points becomes 1/2 of the chain pitch 2, which is equal to the distance between two pins of the link plate. Similarly, the pitch line Lo of the outside tooth faces is a line passing parallel to the pin center line Lp over the two outside tooth faces 2 at points where the distance between the two points becomes 3/2 of the chain pitch P.

More specifically, the profiles of the V-shaped link teeth 10 of the Link plate 100 are interrelated to each other to satisfy Hi≦Ho, where Hi is a distance from the pin center line Lp to the pitch line Li of the inside tooth faces and Ho is a distance from the pin center line Lp to the pitch line Lo of the outside tooth profiles.

Though not shown, the sprocket S to be intermeshed with the silent chain C has teeth of profiles formed in a hobbing process using a hob cutter.

It has been known that when the silent chain arranged as explained above is brought into meshing engagement with the sprocket S, the silent chain C is wound around the sprocket in a polygonal manner and used practically in such manner.

However, since the link plates 100 of the silent chain C mesh at their outside tooth faces alone with the teeth of the sprocket S, the silent chain makes, upon commencement of and release from meshing engagement with the sprocket, a polygonal motion involving up and down movements radial of the sprocket.

A quantitative analysis of the polygonal motion may be made. As can be appreciated from FIG. 8, since a pitch angle of the silent chain C and the number of teeth N of the sprocket S have relations expressed by α=(360°/N), the followings may be established.

First, when the chain pitch is P and the center of the sprocket S, the connecting pin 200a and a free-span part of the chain C following the link plate 100b are arranged to form a right angle, the distance from the center of the sprocket S to the connecting pin 200a on the free-span part of the chain becomes U=P/2 sin(α/2). The term "free-span part of the chain" used herein represents a chain portion not completely engaged with the sprocket but being in a process of engaging with the sprocket. In other words, the free-span part of the chain is that part of the chain which is not completely constricted by the sprocket and is thus placed in a relatively free state.

Next, as shown in FIG. 9, when the sprocket S is rotated half a pitch angle α/2 and the centers of the sprocket S and the link plate 100b and the free-span part of the chain are positioned to form a right angle, the distance from the center of the sprocket S to the pitch line of the free-span part of the chain is expressed by V=P/2 tan(α/2).

As can be readily appreciated from the above discussion, the silent chain C just started meshing with the sprocket S makes a polygonal motion of amplitude Hs=U−V involving up and down movements during half pitch angle (α/2) rotation of the sprocket S.

Consequently, in the thus-arranged conventional silent chain power transmission apparatus, the polygonal motion of amplitude Hs=U−V and associated up and down movements cause the link plates 100a, 100b, 100c to hit the teeth of the sprocket S, resulting in an undesired motion. In addition, when the silent chain apparatus is operated at a high speed, undesired vibratory and impact sounds are produced at the start of meshing of the silent chain with the sprocket. Further, impact of the chain C against the sprocket S shortens the lives of the chain and sprocket. Moreover, the polygonal motion causes the tension of the chain to change, thereby further decreasing durability of the silent chain.

To this end, an improved silent chain power transmission apparatus has been proposed in Japanese Patent Laid-Open Publication No. HEI-8-184348 in which arrangements are made to reduce vibrations, sounds and chain tension fluctuations arising owing to the polygonal motion of the chain. The disclosed apparatus comprises a silent chain having rows of interleaved link plates with teeth defined by inner and outer flank surfaces, and a sprocket having teeth for meshing with the link plate teeth. The sprocket is gear-cut by using a rack cutter having teeth of profiles identical to the profiles of the link plates upon linear stretching of the silent chain. As a result, the silent chain can mesh with the sprocket teeth smoothly, thereby minimizing polygonal motion of the chain and thus reducing noisy impact sounds.

In the thus-arranged silent chain power transmission apparatus, upon commencement of intermeshing, since the link plates of the silent chain come into meshing engagement with the sprocket in a similar manner as the tooth profiles of the rack cutter, the chain polygonal motion can be minimized. However, when the link plates of the silent chain wind around and get seated on the sprocket, the chain polygonal motion arises as in the conventional power transmission apparatus. Thus, it is not possible for the proposed power transmission apparatus to completely kill the chain polygonal motion throughout the course of meshing of the chain with the sprocket. Consequently, vibrations, noisy sounds and chain tension fluctuations produced in the proposed power transmission apparatus cannot be reduce to substantially zero.

Moreover, due to the polygonal motion of the chain, a concave bottom surface defined between the opposed inner flanks or tooth faces of each link plate interferes with the edges of the teeth of the sprocket. Similarly, the edges of the V-shaped teeth of the link plates interfere with the root bottoms of the sprocket. As a result, partial wear and breakage are inevitable at the interfering parts of the chain and sprocket.

SUMMARY OF THE INVENTION

It is therefore an object of the present invention to provide a silent chain power transmission apparatus which can prevent up and down movements of a silent chain thereof, which are due to polygonal motion of the chain when the chain intermeshes with, and becomes seated on, a sprocket, and thereby substantially reduce vibratory and impact sounds and fluctuation in tensioning of the chain, and which can prevent wear of concave bottom surfaces of link plates forming the chain, edges of V-shaped teeth of the link plates and the root bottom of the sprocket and thereby improve durability of the apparatus.

According to the present invention, there is provided a silent chain power transmission apparatus which comprises: an endless silent chain comprised of a multiplicity of link plates interleaved by a multiplicity of connecting pins, each of the link plates having a pair of V-shaped teeth and a pair of pinholes for fitting the connecting pins, each of the V-shaped link teeth having opposed inside tooth faces defining insides thereof and outside tooth faces defining outsides thereof; and a sprocket having a plurality of involute teeth for intermeshing with the V-shaped teeth of the link plates, the inside tooth faces having profiles identical to tooth profiles arranged axially of a hob cutter for forming the involute teeth of the sprocket, the inside and outside tooth faces being profiled to satisfy the expression Hi=Ho+Hs, where Hi is a distance from a pin center line, passing over the centers of the connecting pins, to a pitch line of the inside tooth faces, Ho is a distance from the pin center line to a pitch line of the outside tooth faces, and Hs is an amplitude of polygonal motion of the chain, each of the link plates having a concave bottom surface continuing from and defined between the opposed inside tooth faces at a position where interference of the concave bottom surface with corresponding tooth edges of the involute teeth, which arises owing to the chain polygonal motion amplitude when the outside tooth faces of the link plate are brought into meshing contact with the involute teeth and get seated thereon, can be avoided.

In a preferred form, the V-shaped teeth have tooth edges provided at a position where interference of the tooth edges with concave bottom surfaces defined between opposed involute teeth of the sprocket can be avoided. The interference arises owing to the chain's polygonal motion amplitude when the outside tooth faces of the link plate are brought into meshing contact with the opposed involute teeth and become seated thereon.

The inside tooth faces of the silent chain may have any profiles as long as they are profiled to conform to the axially-arranged tooth profiles of the hob cutter for hobbing the sprocket. They may have linear tooth profiles or curved tooth profiles. The hob cutter used to form the involute teeth on the sprocket has linear tooth profiles. Other hob cutters having special curved tooth profiles may also be used depending on the tooth profiles of the sprocket.

Similarly, the outside tooth faces of the silent chain may have any profiles as long as they satisfy Hi=Ho+Hs. They may have linear or curved tooth profiles, or a combination thereof. They may be formed by punching a link plate or profiled in a shaping process such as sintering.

It is essential that the concave bottom surface of the link plate be formed at a position where its interference with the edges of the sprocket teeth can be avoided. The interference arises owing to the amplitude of the chain's polygonal motion upon meshing engagement of the outside tooth faces of the link plate with the sprocket. If the concave bottom surface is provided at a position excessively far away from the position where such interference can be avoided, then the distance from the concave bottom surface to the rear part of the link plate and the distance from the pinholes become small, thereby decreasing strength of the link plate. Thus, the concave bottom surface should be provided at a position as close as possible to the position where such interference can be avoided.

Since the concave bottom surface of the link plate has an arcuate profile, stress applied to the root bottom surface upon power transmission can be uniformly dispersed. This leads to the advantage that decrease in strength of the link plate can be prevented.

It is also essential that the edges of the V-shaped link teeth are profiled at a position where their interference with the root bottoms of the sprocket, which arises owing to the amplitude of the chain polygonal motion when the outside tooth faces of the link plate get engaged with the teeth of the sprocket and seated on the latter, can be avoided. Such link tooth edges may have linear tooth profiles or curved tooth profiles, or a combination thereof.

In operation of the silent chain power transmission apparatus of the present invention, the V-shaped teeth formed on the link plates of the silent chain starts to mesh with teeth of the sprocket at the respective inside tooth faces and they are seated on the sprocket via meshing engagement between the outside tooth faces and the sprocket teeth as the link plates travel around the sprocket.

In this instance, since the inside tooth faces have profiles identical to tooth profiles arranged axially of a hob cutter for forming the teeth of the sprocket, the inside faces of the link plates, coming in succession from the tangential direction of the sprocket in the same manner as the hob cutter, are accepted by the sprocket without resistance and can smoothly start to mesh with the sprocket teeth. This enables the distance from the free-span part of the chain to the sprocket center to be maintained always constant.

By the relation Hi=Ho+Hs established between the inside and outside tooth faces, the inside tooth faces of the link plates approaching the sprocket in the tangential direction project outward from the outside tooth faces of the overlapping preceding link plates. Even when the sprocket turns half a pitch angle to cause polygonal motion of the chain with an amplitude Hs in the course from the start of mesh of the inside tooth faces to the seating of the outside tooth faces relative to the same sprocket tooth, the inside tooth faces projecting outward from the outside tooth faces preferentially contact the sprocket tooth, so that the distance from the center of the sprocket to the centers of pin holes in the link plates can be always kept constant. This eliminates up and down movements of the silent chain with respect to the sprocket.

In addition, the concave bottom surface of the link plate is provided at a position where its interference with the corresponding tooth edge of the sprocket, which results from the amplitude Hs of the polygonal motion of the chain, can be avoided. This enables the link plates, approaching the sprocket in the tangential direction, to wind around the tooth edges of the sprocket without contacting the concave bottom surfaces defined between the teeth of the link plates. Further, at the seated position, upon rotation through half a pitch angle, the concave bottom surface of the link plate 100a subsides toward the center of the sprocket S by the amplitude of the chain polygonal motion. This ensures that the outside tooth face of the link plate is brought into a seated position on the sprocket.

Furthermore, the tooth edge of the V-shaped link tooth has its profile positioned so that its interference with the confronting root bottom of the sprocket, which results from the amplitude Hs of the polygonal motion of the chain, can be avoided. As a result, the link plate traveling toward the sprocket in the tangential direction winds around the sprocket with its tooth edge kept away from the root bottom. Upon seating of the link plate on the sprocket as a result of its advance by half a pitch angle, the tooth edge of the link plate sinks toward the center of the sprocket by a distance corresponding to the amplitude Hs of the polygonal motion of the chain, thereby ensuring that the outside tooth faces of the link plate are seated on the sprocket.

BRIEF DESCRIPTION OF THE DRAWINGS

A preferred embodiment of the present invention will hereinafter be described in detail, by way of example only, with reference to the accompanying drawings, in which.

DETAILED DESCRIPTION OF THE PREFERRED EMBODIMENT

The following description is merely exemplary in nature and is in no way intended to limit the invention or its application or uses.

The term "pin center line" used herein represents a line passing over the centers of connecting pins. The term "pitch line of inside tooth faces" used herein represents a line passing parallel to the pin center line over two inside tooth faces of a link plate at points where a distance between those points becomes 1/2 of a chain pitch, which is equal to the distance between two pins of a link plate. The term "pitch line of outside tooth faces" used herein represents a line passing parallel to the pin center line over two outside tooth faces of a link plate at points where the distance between those points becomes 3/2 of the chain pitch.

The term "chain polygonal motion" used herein represents up and down movements of a silent chain with respect to a sprocket, which occur while the sprocket turns half a pitch angle. The term "amplitude" of the chain polygonal motion used herein represents an amplitude of polygonal motion of the chain, which is determined depending on the number of sprocket teeth to be intermeshed with the chain. More specifically, it represents an amplitude of vertical movements of the chain radial of the sprocket upon meshing of the outside tooth faces alone with the sprocket.

The term "free-span part of the chain" used herein represents that part of the chain which is about to start or has just started an action of meshing engagement with the sprocket but has not yet got seated on the latter. That is, a free-span chain part is that part of the chain which is not fully constricted by the sprocket and hence is relatively free.

Figure 1:
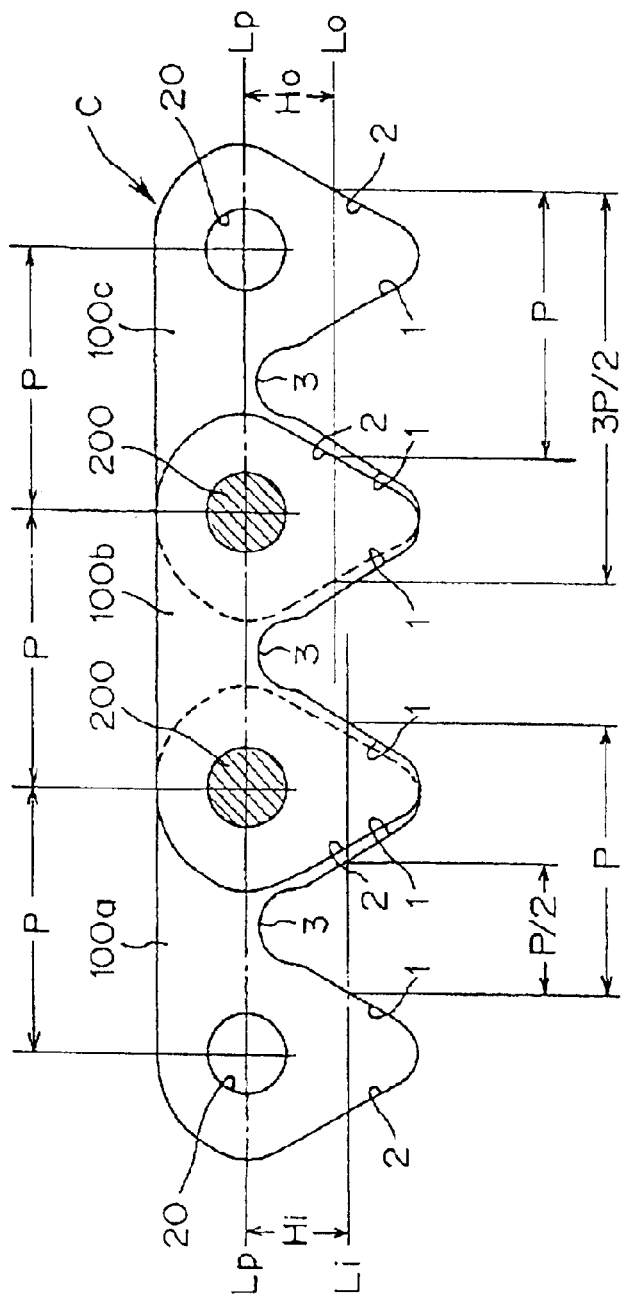
FIG. 1 is a schematic illustration of a silent chain employed in a silent chain power transmission apparatus according to the present invention.

Referring now to FIG. 1, a silent chain C is shown as applied to a silent chain power transmission apparatus according to a preferred embodiment of the present invention. The silent chain power transmission apparatus comprises an endless silent chain C and a sprocket S for meshing with the silent chain to transmit power. The endless silent chain C comprises a multiplicity of link plates 100 or 100a, 100b and 100c interleaved in a fingers-crossed fashion by means of connecting pins 200 or 200a, 200b and 200c. Each link plate has a pair of V-shaped teeth 10, 10 and a pair of apertures or pinholes 20, 20 into which the connecting pins are fitted.

Figure 2:
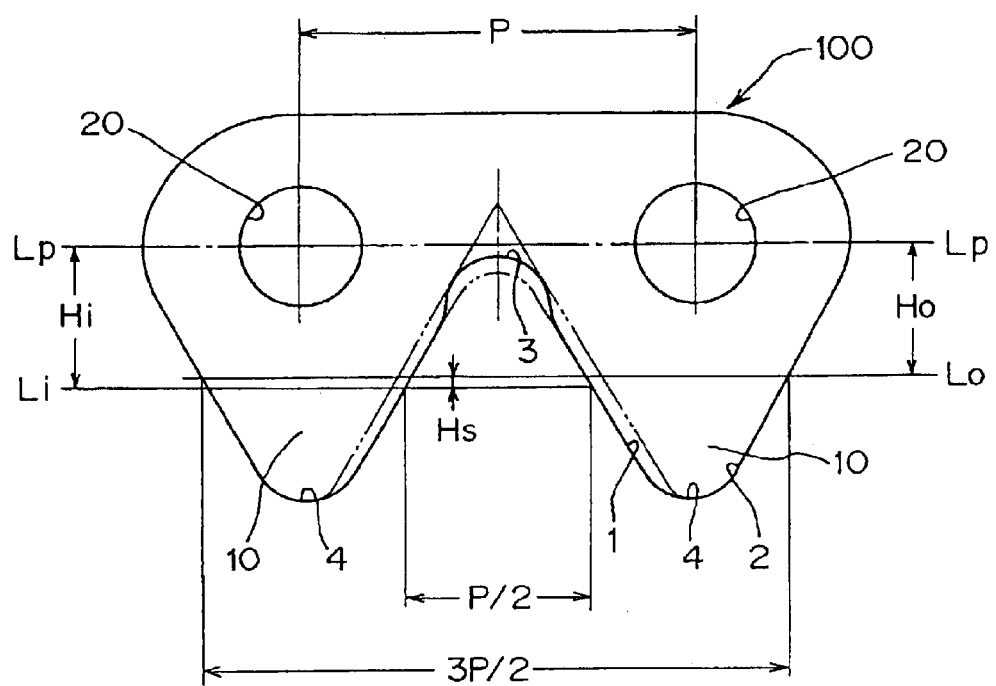
FIG. 2 is an enlarged side view of a link plate of the silent chain shown in FIG. 1.

As shown in FIG. 2, each V-shaped link tooth 13 has a linear inside tooth face 1 profiling its inner side and a linear outside tooth face 2 profiling its outer side. These faces 1, 2 have a positional interrelation expressed by Hi=Ho+Hs, where Hi is a distance from a pin center line Lp, passing over the centers of the connecting pins 200, to a pitch line Li of the inside tooth faces 1, Ho is a distance from the pin center line Lp to a pitch line Lo of the outside tooth faces 2, and Hs is an amplitude of polygonal motion of the chain.

As can be appreciated from FIG. 1, in the embodiment being discussed, all of the link plates 100a, 100b, 100c are configured identically. Consequently, the respective distances between the inside tooth faces 1, 1 of one link plate and corresponding inside tooth faces 1, 1 of an adjacent link plate are equal to a pitch P corresponding to a distance between two adjacent connecting pins 200. Similarly, the respective distances between the outside tooth faces 2, 2 of one link plate and corresponding outside tooth faces 2, 2 of an adjacent link plate are equal to the pitch P.

Each link plate 100 has a concave bottom surface 3 continuing from and defined between the opposed inside tooth faces 1, 1. To avoid its interference with tooth edges of a sprocket S (see FIG. 3), which may arise owing to the chain polygonal motion amplitude Hs when the outside tooth faces 2, 2 of the link plate 100 engage with the sprocket S and the link plate gets seated on the sprocket, the concave bottom surface 3 is scooped out to extend the amplitude Hs closer to the connecting pins than a conventional arc-shaped bottom surface and deeper inwardly and backwardly.

Tooth edges 4 of the V-shaped link teeth 10 are provided to continue from the inside and outside tooth faces 1, 2. Each tooth edge 4 has an arcuate configuration and is profiled at a position where its interference, resulting from the amplitude Hs of the chain polygonal motion upon meshing contact of the outside tooth surface 2 of the link plate 100 with an opposed surface of a corresponding involute tooth of the sprocket S, with a root bottom defined between that and succeeding involute teeth of the sprocket S, can be avoided.

Figure 3:
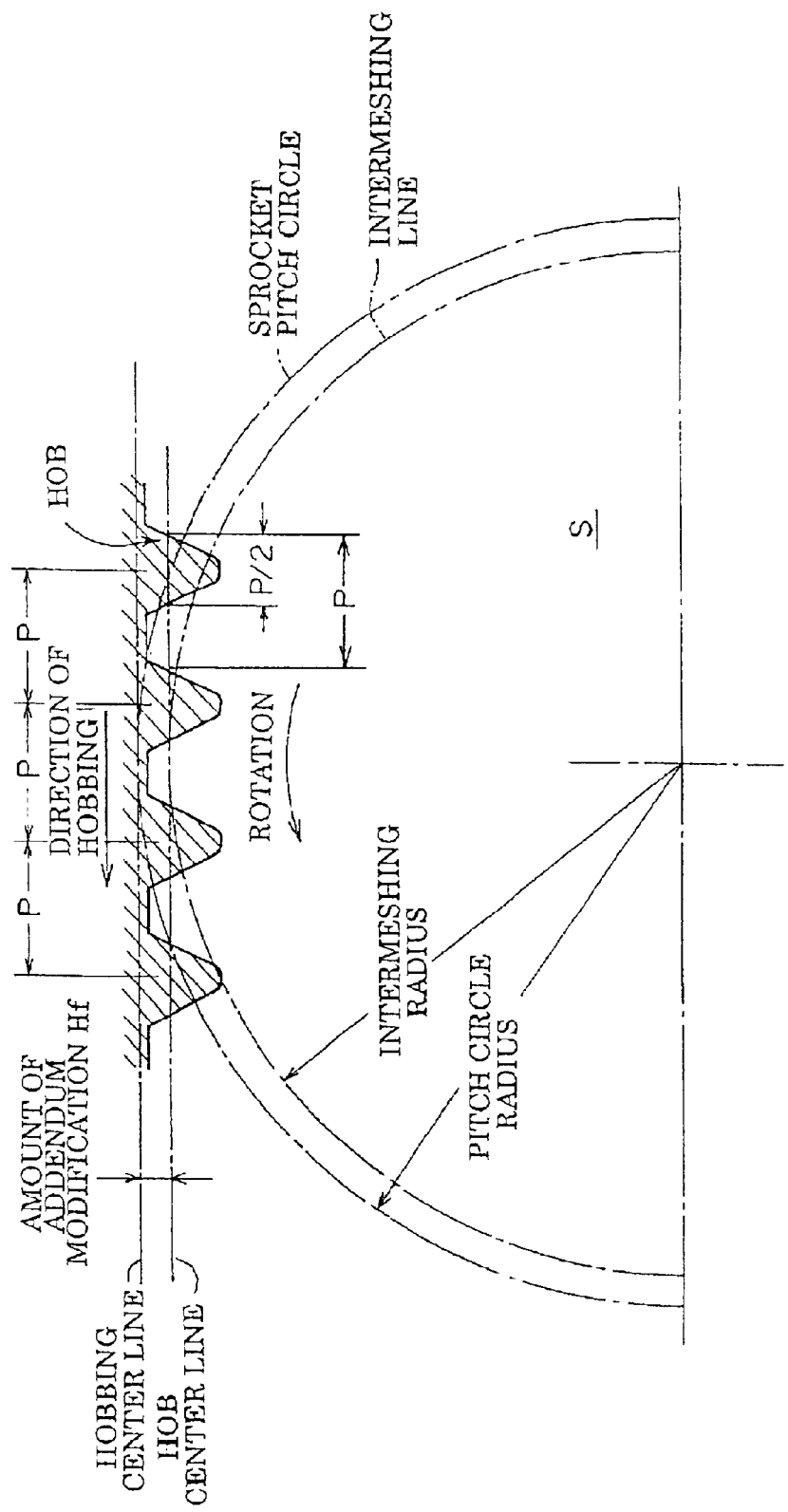
FIG. 3 is a schematic illustration of a hobbing process with respect to a sprocket employed in the power transmission apparatus of the present invention.

As shown in FIG. 3, the sprocket S has involute teeth for meshing with the V-shaped teeth 10 of the link plates 100 of the endless silent chain C to transmit motive power. These involute teeth are formed by an ordinary hobbing process in which a hob cutter with teeth profiled correspondingly to the outer configurations of the link teeth is used to cut out a peripheral portion of the sprocket by an amount of addendum modification Hf between a hobbing center line (tangential to a pitch circle radius of the sprocket) and a hob center line (tangential to an intermeshing radius of the sprocket).

Consequently, as the endless silent chain C is spread out linearly, the inside tooth faces 1 of the V-shaped link teeth 10, with which the intended meshing is started, conform in configuration to the profiles of axially linearly arranged teeth of the hob cutter for forming the involute teeth of the sprocket S. This enables initiation of smooth meshing engagement of the inside tooth faces 1 with the sprocket S and keeps the height from a free-span part of the chain C to the center of the sprocket S constant. As a result, vibratory noises of the free-span part of the silent chain C and changes in tensioning of the chain can be reduced.

Next, operation of the thus-arranged silent chain power transmission apparatus will be discussed with reference to FIGS. 4 to 6.

Figure 4:
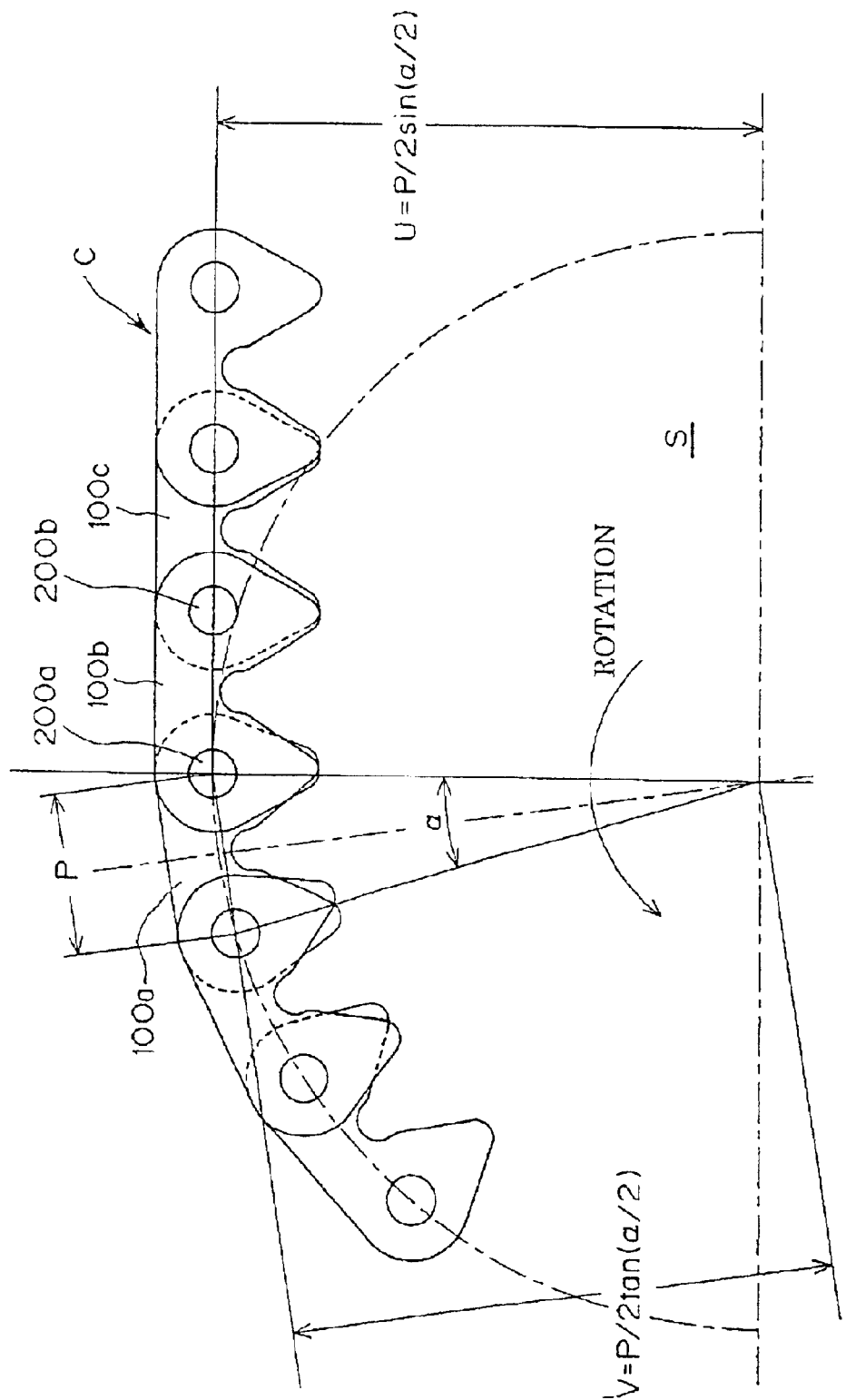
FIG. 4 is a schematic side view illustrating a state of meshing of the silent chain with the sprocket.

Illustrated in FIG. 4 is a chain-sprocket meshing state in which the center of the sprocket S, the connecting pin 200a and the free span chain are arranged to form a right angle.

Figure 8:
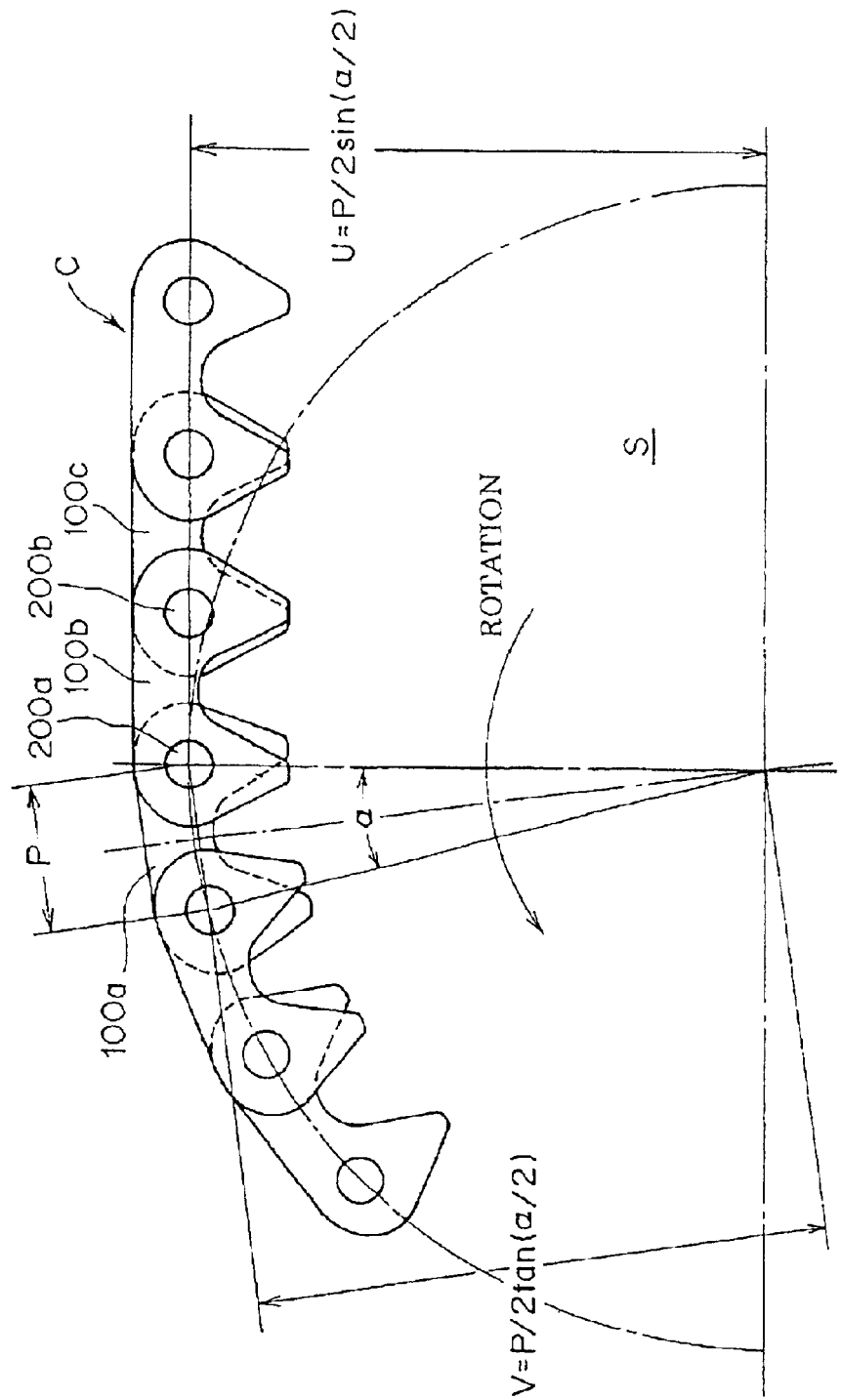
FIG. 8 is a schematic view illustrating a conventional chain-sprocket meshing state.

As in the conventional meshing state illustrated in FIG. 8, the link plate 100a is placed in meshing engagement with the sprocket S, with its both outside tooth faces 2, 2 held in contact with the corresponding involute tooth of the sprocket. Thus, the distance from the center of the sprocket S to the connecting pin 200a on the free-span part of the chain is expressed by $U=P/2 \sin(\alpha/2)$. However, the distance from the center of the sprocket S to the pin center line Lp over the link plate 100b in the free-span chain part may not be fixed, because the inside tooth face 1 located on a fore side of a direction of travel of the chain is brought into meshing engagement with the corresponding involute tooth of the sprocket S.

The free-span chain part succeeding to the link plate 100b is pulled tight linearly by chain tension. This state may be regarded as a hob cutter having teeth of trapezoidal cross section formed by a multiplicity of inside teeth surfaces 1 arranged axially of the hob and bulged beyond imaginary profiles symmetrical with the profiles of the outside tooth faces 2. Thus, the free-span chain part and the involute teeth of the sprocket S are placed in a state identical to a well-known state of hobbing using a hob cutter.

The link plate 100b is in meshing engagement with the sprocket S with its inside tooth faces 1 on the fore side of the direction of travel of the chain held against the corresponding involute tooth of the sprocket. The pitch line Li for the inside tooth face is positioned the distance Hs further away from the pin center line Lp than the pitch line Lo for the outside tooth face. Consequently, the distance from the center of the sprocket S to the pin center line Lp over the link plate 100b of the free span chain part may be expressed by V+Hs=U.

Figure 5:
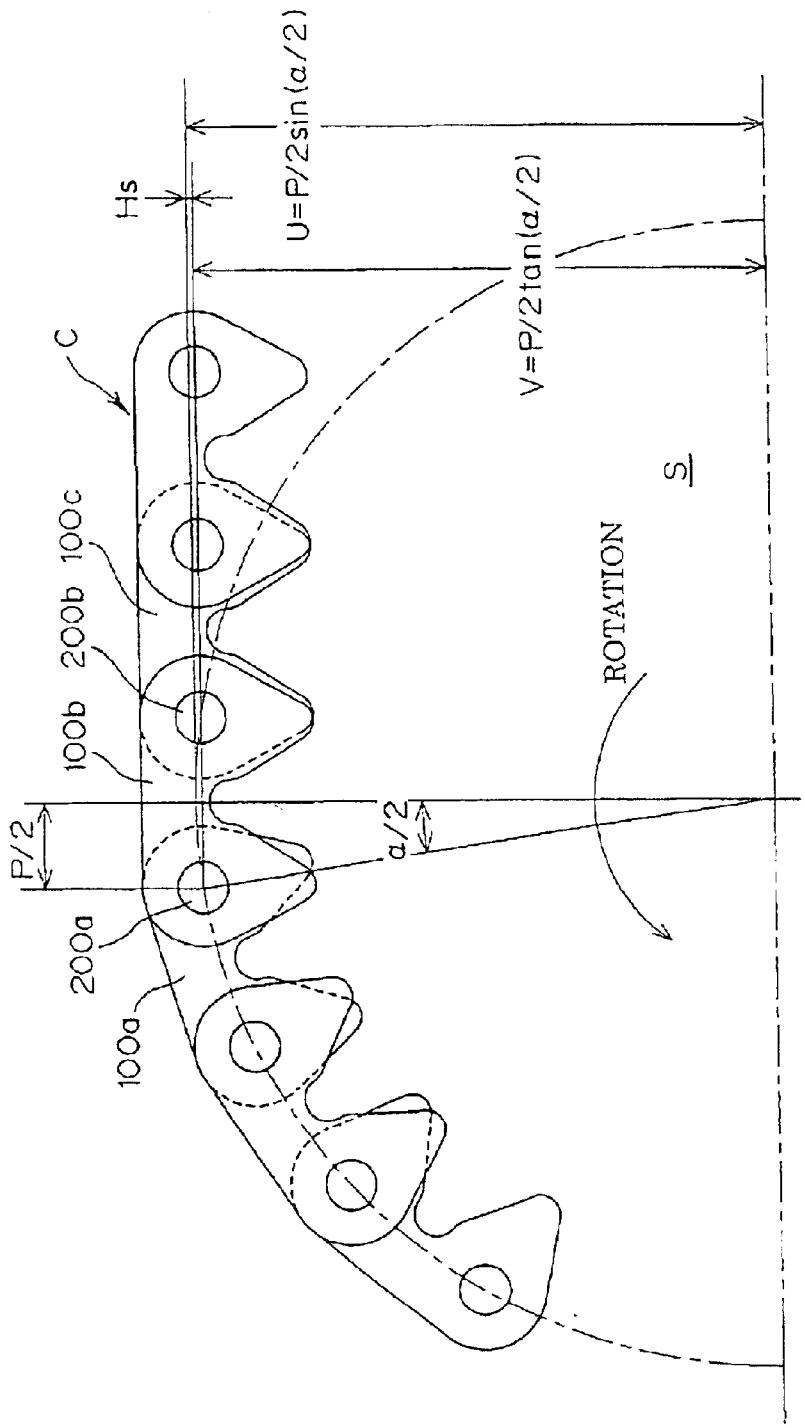
FIG. 5 is a schematic side view illustrating a chain-sprocket meshing state in which the sprocket is rotated half a pitch angle ($\alpha/2$) from the meshing state of FIG. 4

Reference is made next to FIG. 5 illustrating a chain-sprocket meshing state in which the sprocket S is rotated half a pitch angle $\alpha/2$ from the meshing state shown in FIG. 4 to advance the link plate half a pitch.

Figure 9:
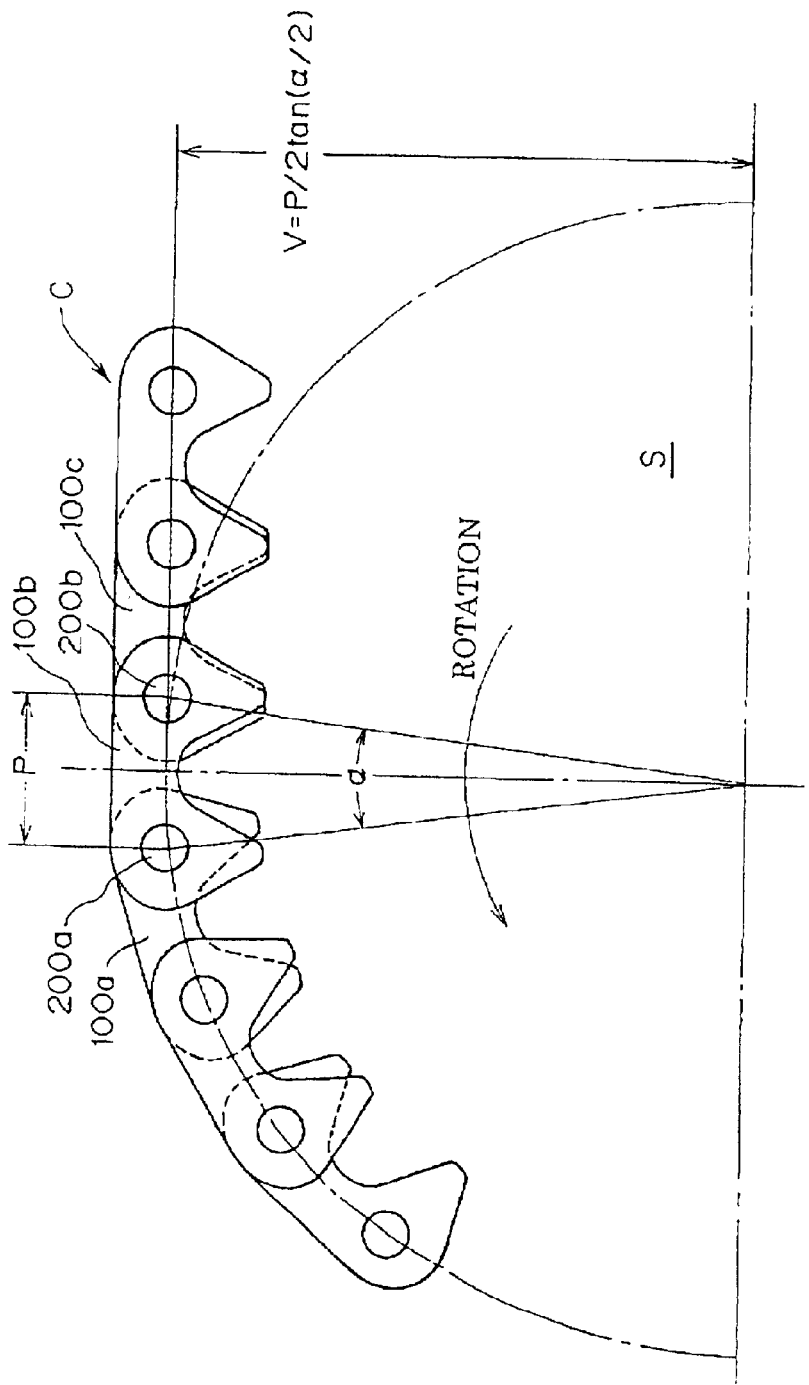
FIG. 9 is a schematic view illustrating a chain-sprocket meshing state in which the sprocket is rotated half a pitch angle ($\alpha/2$) from the meshing state of FIG. 8.
Figure 10:
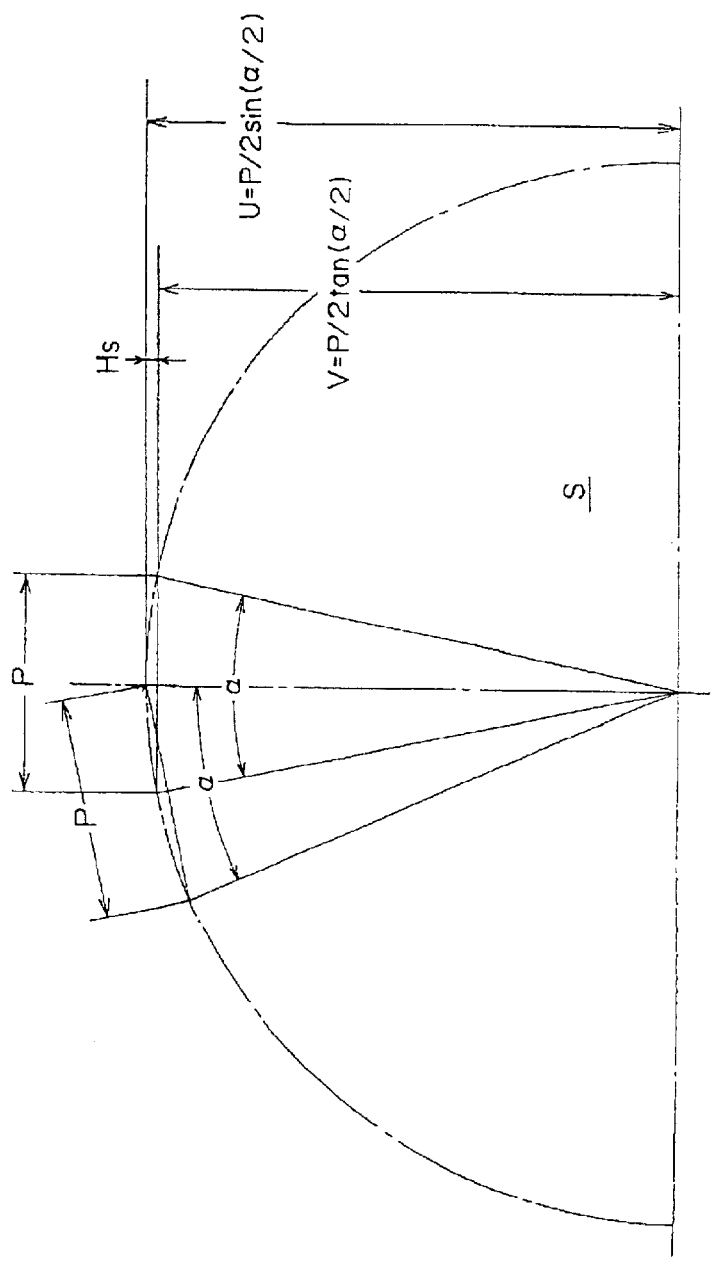
FIG. 10 is a schematic view illustrating a polygonal motion of the conventional silent chain.

As in the conventional meshing state shown in FIG. 9, the link plate 100a now comes into a seated position on the sprocket S with its both outside tooth faces 2, 2 held in meshing contact with the corresponding involute teeth of the sprocket. Thus, the height from the sprocket center to the connecting pin 200a may be expressed by $V=P/2 \tan(\alpha/2)$.

In contrast, the link plate 100c is meshed with the sprocket with its inside tooth face 1 on the fore side of the direction of travel of the chain held against the mating involute tooth of the sprocket. The pitch line Li for the inside tooth face is Hi=Ho+Hs. Thus, the intermeshing height V becomes the distance Hs larger than that in the conventional silent chain as shown in FIG. 9. Therefore, the distance from the sprocket center to the connecting pin 200b is $U=P/2 \sin(\alpha/2)$.

Consequently, the link plate 100c is kept constantly at height U throughout its travel from the start of meshing engagement of the inside tooth face 1 of the link plate 100c with the sprocket S, as shown in FIG. 4, until arrival of the connecting pin 200b at a position where the connecting pin 200a was.

At this time, the inside tooth face 1 of the link plate 100b moves away from the sprocket S as a result of a bending action of the chair about the connecting pin 200a while the link plate 100b, supported by the connecting pins 200a and 200b, winds around and smoothly intermeshes with the sprocket S. In contrast, having the relation Hi=Ho+Hs, the outside tooth face 2 of the link plate 100b is still kept away from the involute teeth and hence the sprocket S.

Figure 6:
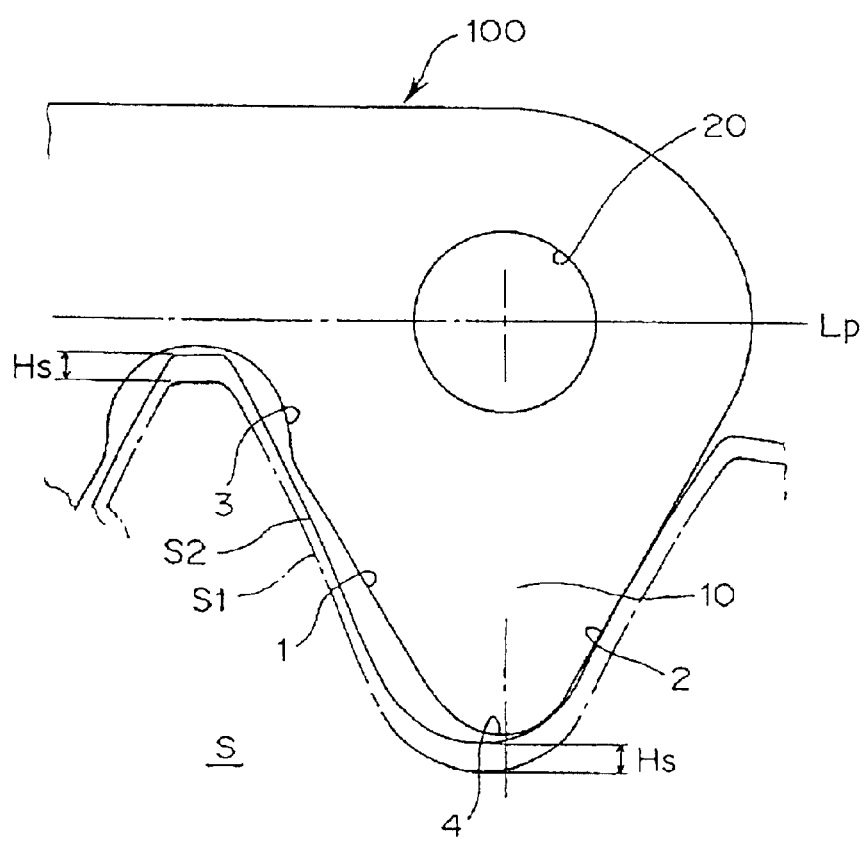
FIG. 6 is an enlarged view showing part of the link plate of the silent chain in meshing engagement with the sprocket.

Reference is made next to FIG. 6 illustrating, on an enlarged scale, a manner of intermeshing of the link plate with the sprocket.

As shown in FIG. 6, the concave bottom surface 3 of the link plate 100 is provided at a position where its interference with the corresponding tooth edge of the sprocket S, which results from the amplitude Hs of the polygonal motion of the chain, can be avoided. This enables the link plates 100a, 100b, 100c, approaching the sprocket S in the tangential direction, to wind around the tooth edges of the sprocket S without contacting the concave bottom surfaces defined between the teeth of the link plates. Further, at the seated position, upon rotation through half a pitch angle, the concave bottom surface 3 of the link plate 100a subsides toward the center of the sprocket S by the amplitude Hs of the chain polygonal motion. This ensures that the outside tooth face 2 of the link plate 100 is brought into a seated position on the sprocket S. Dash-and-dot line S1 in FIG. 6 represents a position of the sprocket S upon commencement of its intermeshing with the link plate 100. Solid line 32 indicates a position of the sprocket S upon seating of the link plate 100 thereon.

As can be seen from FIG. 6, the tooth edge 4 of the V-shaped link tooth 10 has its profile positioned so that its interference with the confronting root bottom of the sprocket S, which results from the amplitude Hs of the polygonal motion of the chain, can be avoided. As a result, the link plate 100, traveling toward the sprocket S in the tangential direction, winds around the sprocket with its tooth edge kept away from the root bottom. Upon seating of the link plate 100 on the sprocket S as a result of its advance movement by half a pitch angle, the tooth edge 4 of the link plate 100 sinks toward the center of the sprocket by a distance corresponding to the amplitude of the polygonal motion of the chain, thereby ensuring that the outside tooth faces 2, 2 of the link plate 100 are seated on the sprocket S.

As thus far explained, the silent chain power transmission apparatus employs an endless silent chain C which is composed of a multiplicity of interleaved link plates each having inside tooth faces profiled such that the distance Hi from the pin center line Lp to the inside tooth face pitch line Li becomes larger than the distance Ho from the pin center line Lp to the outside tooth face pitch line Lo by an amount equal to the polygonal motion amplitude Hs. Since the thus-arranged silent chain becomes engaged with the involute teeth of the sprocket 3, the chain polygonal motion becomes substantially zero. Further, since the free-span part of the chain is prevented from up and down movements due to the polygonal motion of the chain, because the free-span part of the chain is constantly kept at the height of U throughout the course of meshing engagement of the silent chain C with the involute teeth of the sprocket S.

Figure 7:
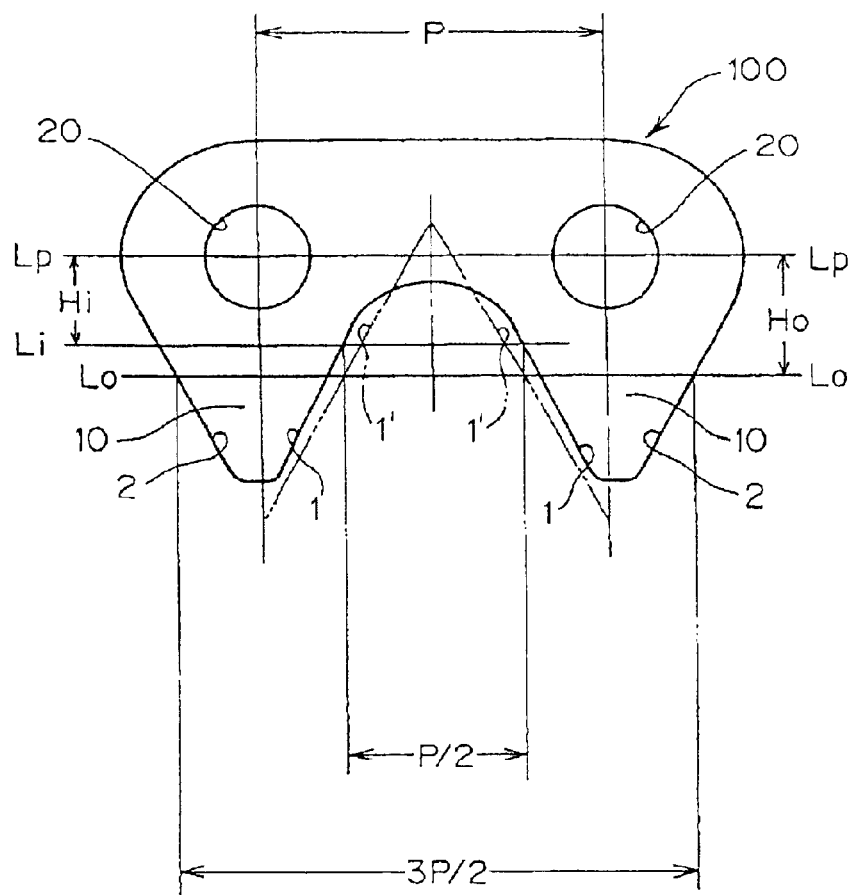
FIG. 7 is a schematic side view illustrating a link plate of a silent chain employed in a conventional silent chain power transmission apparatus.

Consequently, it becomes possible, in the course from the start of the chain-sprocket meshing to the full chain-sprocket meshing, to prevent vertical vibrations of the chain owing to the chain polygonal motion to thereby decrease undesired vibratory and impact sounds produced upon meshing of the chain with the sprocket, because the distance from the sprocket center to the chain is kept at the constant value of U. This cannot be achieved by the conventional silent chain power transmission apparatus, as shown in FIG. 7, which is comprised of link plates having the relation of Hi≦Ho.

In the link plate according to the preferred embodiment described above, the concave bottom surface 3 is scooped out deeper than the arc-shaped bottom surface 3 of the conventional link plate 100. Thus, the link plate 100 becomes lighter by a weight corresponding to the scooped-out portion. Further, by virtue of the concave profile of the bottom surface 3, it becomes possible to uniformly disperse stresses applied to the concave bottom surface 3 upon power transmission, thereby preventing decrease in strength of the link plate 100. Moreover, it becomes possible to prevent partial wear or chipping of the tooth edges 4 of the V-shaped link teeth 10 and/or the root bottom of the sprocket S, thereby improving durability of the silent chain and hence the power transmission apparatus employing the same.

The silent chain power transmission apparatus according to the present invention has various advantages as enumerated below.

(1) By virtue of the profiles identical to tooth profiles arranged axially of a hob cutter for forming the teeth of the sprocket, the inside tooth faces can smoothly start to mesh with the sprocket teeth to thereby ensure that the distance from the free-span part of the chain to the sprocket center can be maintained always constant. This can reduce the noise produced from the free-span part of the chan and also decrease fluctuations of chain tension.

(2) Owing to the relation Hi=Ho+Hs established between the inside and outside tooth faces, even when the sprocket turns half a pitch angle to cause a polygonal chain motion with an amplitude in the course from the start of mesh of the inside tooth faces to the seating of the outside tooth faces relative to the same sprocket tooth, the inside tooth faces projecting outward from the outside tooth faces preferentially contact the sprocket tooth. It becomes possible to prevent vertical vibrations of the chain owing to the polygonal chain motion and thereby decrease undesired vibratory and impact sounds produced upon meshing of the chain with the sprocket, because the distance from the sprocket center to the centers of pin holes in the link plates of the chain is kept at the constant value. This cannot be achieved by the conventional silent chain power transmission apparatus, which is composed of link plates-having the relation of Hi≦Ho.

(3) The concave bottom surface of the link plate is provided at a position where its interference with the corresponding tooth edge of the sprocket, which results from the amplitude of the polygonal motion of the chain, can be avoided. At the seated position, upon rotation through half a pitch angle, the concave bottom surface of the link plate subsides toward the center of the sprocket by the amplitude of the polygonal chain motion. This ensures that the outside tooth face of the link plate is brought into a seated position on the sprocket regardless of the occurrence of the polygonal movement of the chain. In addition, since the concave bottom surface is scooped out deeper than the arc-shaped bottom surface of the conventional link plate, the link plate becomes lighter by a weight corresponding to the scooped-out portion. Further, by virtue of the concave arcuate profile of the bottom surface, it becomes possible to disperse stresses applied to the concave bottom surface upon power transmission uniformly, thereby preventing decrease in the strength of the link plate.

(4) The tooth edge of the V-shaped link tooth has its profile positioned so that its interference with the confronting root bottom of the sprocket, which results from the amplitude of the polygonal motion of the chain, can be avoided. As a result, the link plate, traveling from a tangential direction toward the sprocket, winds around the sprocket with its tooth edge kept away from the root bottom. It is, therefore, possible to prevent partial wear or chipping of the tooth edges of the V-shaped link teeth and/or the root bottom of the sprocket, thereby improving durability of the silent chain and hence the power transmission apparatus employing the same. In addition, upon seating of the link plate on the sprocket as a result of its advance movement by half a pitch angle, the tooth edge of the link plate sinks toward the center of the sprocket by a distance corresponding to the amplitude of the polygonal motion of the chain, thereby ensuring that the outside tooth faces of the link plate are seated on the sprocket.

Obviously, various minor changes and modifications of the present invention are possible in the light of the above teaching. It is therefore to be understood that within the scope of the appended claims, the present invention may be practiced otherwise than as specifically described.

What is claimed is:

1. A silent chain power transmission apparatus comprising:

an endless silent chain comprising a multiplicity of link plates connected in interleaved relationship by a multiplicity of connecting pins, each of said link plates having a pair of V-shaped teeth and a pair of pinholes for fitting said connecting pins, the V-shaped teeth of each said pair having opposed inside tooth faces defining insides thereof and outside tooth faces defining outsides thereof; and a sprocket having a plurality of teeth in intermeshing relationship with said V-shaped teeth of said link plates;

said inside and outside tooth faces being positioned to satisfy the expression Hi=Ho+Hs, where Hi is the distance from a pin center line, passing through the centers of a pair of said connecting pins, to a pitch line of the inside tooth faces of a link plate in which said pair of connecting pins is fitted, Ho is a distance from said pin center line to a pitch line of the outside tooth faces of a link plate in which said pair of connecting pins is fitted, and Hs is the amplitude of polygonal motion of said chain;

each of said link plates having a concave bottom surface continuing from and defined between its opposed inside tooth faces at a position to avoid interference of said concave bottom surface with corresponding tooth edges of said sprocket teeth, which arises due to said polygonal motion when said outside tooth faces of said link plate are brought into meshing contact with said sprocket teeth and become seated thereon; and said inside tooth faces having profiles identical to tooth profiles, arranged axially, of a hob cutter capable of forming said teeth of said sprocket;

wherein the concave bottom surface of each of said link plates is an arc-shaped surface scooped out more deeply than an arc tangent to said opposed inside tooth faces.

2. A silent chain power transmission apparatus according to claim 1, wherein said V-shaped teeth have tooth edges profiled at a position where interference of said tooth edges with root bottoms defined between opposed ones of said teeth of said sprocket, which arises due to said polygonal motion when said outside tooth faces of said link plates are brought into meshing contact with said opposed ones of said sprocket teeth and become seated thereon, can be avoided.

* * * * *